Patented May 15, 1923.

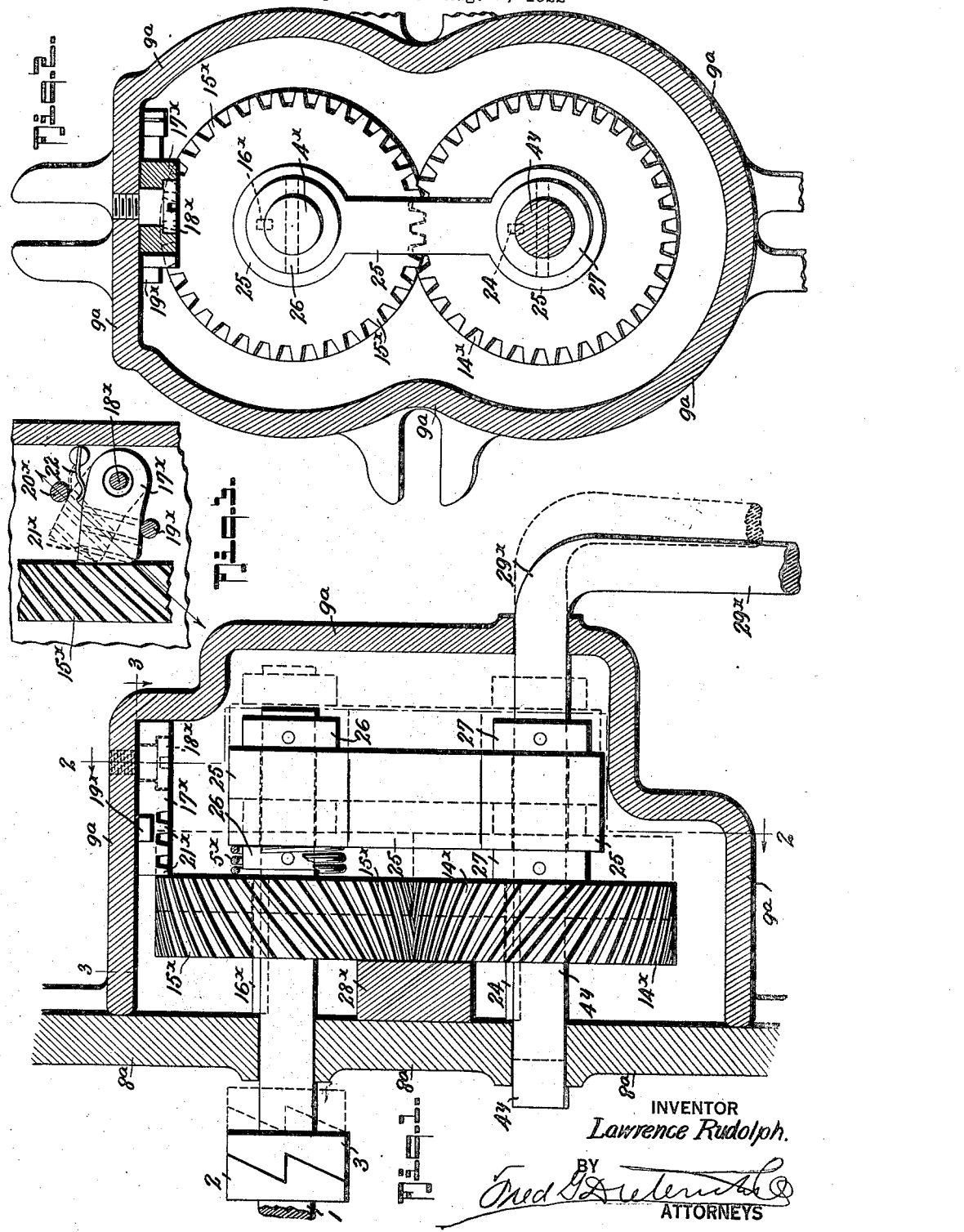

1,455,229

UNITED STATES PATENT OFFICE.

LAWRENCE RUDOLPH, OF LOUISVILLE, KENTUCKY, ASSIGNOR TO RUDY RUDOLPH, OF PENSACOLA, FLORIDA.

SAFETY CRANK.

Original application filed August 7, 1922, Serial No. 580,368. Divided and this application filed November 15, 1922. Serial No. 601,127.

*To all whom it may concern:*

Be it known that I, LAWRENCE RUDOLPH, a citizen of the United States, residing at Louisville, in the county of Jefferson and State of Kentucky, have invented certain new and useful Improvements in Safety Cranks, of which the following is a specification.

My invention relates to certain new and useful improvements in safety crank devices for internal combustion engines, especially those employed in motor vehicles, motor boats, and aerial navigating machines, and the present invention is an embodiment of the generic invention disclosed in my application filed August 7, 1922, Serial No. 580,368 of which said application the present is a divisional one.

In this application I make no generic claim to the invention in common between this application and that of my original application as it is the intention in this application to claim only the specific embodiment herein shown and described and the equivalents thereof within the terms of the appended claims.

In the drawing:

Figure 1 is a side elevation (the support and casing being shown in section) illustrating the present embodiment of my invention.

Figure 2 is a vertical section on the line 2—2 of Figure 1.

Figure 3 is a detail section and part elevation on the line 3—3 of Figure 1.

In the drawing, in which like numerals of reference designate like parts in all the figures, the casing or support consists of the parts $8^a$ and $9^a$ and these are provided with suitable shafts bearings for the two part crank shaft $4^x$ and $4^y$. The crank shaft parts in this embodiment of the invention do not lie in alignment with one another as in the embodiment to which specific claims are drawn in my original application, but lie parallel in different planes.

The crank shaft part $4^x$ carries the clutch element 3 which engages a clutch element 2 on the engine shaft 1 for purposes of cranking. The crank shaft part $4^y$ has a crank $29^x$ by which it is adapted to be turned. The two parts of the cranking shaft $4^x$ and $4^y$ are connected together by a pair of spiral gears $14^x$ and $15^x$ which are keyed to the shafts to turn with them by keys 24 and $16^x$. The cranking shaft parts, however, have a longitudinal motion relative to the spiral gears.

The cranks shaft parts $4^x$—$4^y$ are also connected to move axially in unison by a yoke 25 held between collars 26 on the shaft part $4^x$ and collars 27 on the shaft part $4^y$. A thrust spring $5^x$ is located, preferably, between the spiral gear $15^x$ and the collar 26 and a space is left between the collar 26 and the gear $15^x$ when the parts are in the position shown in Figure 1 to allow a small amount of lost motion to occur before the gear $15^x$ can engage the collar 26 in order that when a "kick back" occurs the gear $15^x$ may be brought into firm mesh with some of the teeth $21^x$ of a pivoted dog $17^x$ which is pivoted at $18^x$ to the casing and operates between stops $19^x$ and $20^x$. A leaf spring $22^x$ is also provided to continuously tend to hold the dog against the stop $19^x$.

In operation assume the parts to be in the position shown in dotted lines in Figure 1; when it is desired to crank the engine the operator pushes in on the crank $29^x$ to mesh the clutch elements 3 and 2. He then starts to turn the crank in a clockwise direction which causes the gears $14^x$ and $15^x$ to lie against the stop $28^x$ and brings the gear $15^x$ fully out of the engagement with the teeth of the dog $17^x$. The rotation of the gear $15^x$ in the counterclockwise direction (Figure 2) causes the disengagement of its teeth from those of the dog and the spring $22^x$ will push the dog to the position shown in Figure 1. Should a "kick back" occur, however, the rotation will be imparted to the gear $15^x$ in a clockwise direction as shown in Figure 2 and the gear $15^x$ will creep outwardly or toward the collar 26, rock the dog $17^x$ to the dotted line position of Figure 3, and cause meshing to occur between the teeth of the gear $15^x$ and the teeth $21^x$ of the dog $17^x$, thereby causing the gear $15^x$ to be thrust quickly from left to right in Figure 1 and by engagement with the collar 26 thrust the parts quickly from the full line to the dotted line position shown in Figure 1 and thereby disengages the clutch.

The space between the gear $15^x$ and collar 26 shown in Figure 1 is designed to allow the teeth of the gear $15^x$ to mesh with the teeth $21^x$ securely before the thrust strains are encountered.

From the foregoing description, taken in connection with the accompanying drawing, it is thought that the complete construction, operation and advantages of the present embodiment of my invention will be clear to those skilled in the art.

What I claim is:

1. In apparatus of the class described, a support having shaft bearings, a two part cranking shaft journaled in said bearings, spiral gears connecting said shaft parts, a yoke having bearings in which said shaft parts are journaled, means on said shaft parts cooperating with said yoke and causing said shaft parts to move axially in unison, a stop adapted to be engaged by said spiral gears, when in the cranking position, a throw out spring carried by one of said shaft parts, a clutch element on one of said shaft parts adapted to engage a similar clutch element on the shaft of the engine to be cranked, means for turning the other shaft part to impart cranking motion, a pivoted toothed dog and stops limiting the pivotal movement of said dog, said dog having teeth adapted, when said dog is in one position, to register with the teeth of one of said spiral gears, said dog normally lying in contact with one of said spiral gears and arranged whereby, when the parts are in the cranking position, the teeth of said dog will be out of register with those of said opposing spiral gear and, when said opposing spiral gear is "kicked back," it will rotate said dog to bring its teeth into meshing alignment with the opposing spiral gear for the purposes specified.

2. In apparatus of the class described, a support having shaft bearings, a two part cranking shaft journaled in said bearings and lying in different planes, a yoke having bearings in which said shaft parts are journaled, spiral gears on said shaft parts which gears are keyed to their respective shaft parts to turn with the same while permitting relative axial movement of the shaft parts and crank, collars on the shaft parts for sustaining the yoke in a definite position with respect to the shaft parts, a pivoted toothed dog adapted to be engaged by one of said spiral gears when a "kick back" occurs to thrust the parts of the cranking shaft outwardly, one of said cranking shaft parts having a clutch element and the other having a gear element, a stop limiting the movement of the spiral gears in one direction, one of said spiral gears having an amount of lost motion to enable its teeth to be meshed with those of the dog before the thrust force is applied to the shaft to disengage the clutch.

LAWRENCE RUDOLPH.